(12) United States Patent
Tanaka et al.

(10) Patent No.: US 6,670,984 B1
(45) Date of Patent: *Dec. 30, 2003

(54) CAMERA CONTROL SYSTEM CONTROLLING DIFFERENT TYPES OF CAMERAS

(75) Inventors: Koichiro Tanaka, Yokohama (JP); Hiroki Yonezawa, Tokyo (JP); Youichi Kazama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 91 days.

(21) Appl. No.: 09/121,690

(22) Filed: Jul. 24, 1998

(30) Foreign Application Priority Data

Jul. 29, 1997 (JP) .............................................. 9-203219
May 19, 1998 (JP) ........................................... 10-136739

(51) Int. Cl.$^7$ ............................. H04N 7/18; H04N 7/15; H04N 7/14
(52) U.S. Cl. .................... 348/159; 348/14.1; 348/211.3
(58) Field of Search ................................. 348/385, 159, 348/143, 555, 556, 558, 153, 563, 15, 17, 13, 211, 14; 725/10

(56) References Cited

U.S. PATENT DOCUMENTS

| | | | |
|---|---|---|---|
| 4,811,098 A | | 3/1989 | Kurakake et al. ............ 358/160 |
| 5,236,199 A | * | 8/1993 | Thomson, Jr. ................ 348/14 |
| 5,305,100 A | * | 4/1994 | Choi ............................ 348/159 |
| 5,444,476 A | * | 8/1995 | Conway ....................... 348/15 |
| 5,481,297 A | * | 1/1996 | Cash et al. ................... 348/385 |
| 5,568,183 A | * | 10/1996 | Cortjens et al. .............. 348/15 |
| 5,625,410 A | * | 4/1997 | Washino et al. ............. 348/154 |
| 5,825,432 A | * | 10/1998 | Yonezawa .................... 348/563 |

FOREIGN PATENT DOCUMENTS

| | | |
|---|---|---|
| DE | 195 34 559 | 3/1997 |
| EP | 0 715 453 | 6/1996 |

OTHER PUBLICATIONS

European Search Report (No. EP 22085) dated Sep. 30, 1999.

* cited by examiner

*Primary Examiner*—Gims Philippe
(74) *Attorney, Agent, or Firm*—Fitzpatrick, Cella, Harper & Scinto

(57) ABSTRACT

A camera control system permits a variety of types of cameras to be connected thereto, and makes it possible to control a plurality of cameras by using standardized camera control commands to enable a user to control them without worrying about the difference in type of cameras connected thereto. The camera control system is also capable of supplying the information on the cameras connected to a user. In a camera server, the information on a video camera connected to the camera server is entered, the input of the information on the video camera that has been entered is determined, and the information on the video camera which has been determined is stored. If an external signal is received, then the external signal is converted to a control signal compatible with the video camera according to the stored information on the video camera.

21 Claims, 13 Drawing Sheets

CAMERA CONTROL SYSTEM CONTROLLING DIFFERENT TYPES OF CAMERAS

BACKGROUND OF THE INVENTION

1. Field of the Invention

The present invention relates primarily to a camera control system ideally used for a monitoring camera, a video conference system, or the like, for exchanging of information via, for example, a network.

2. Description of the Related Art

Hitherto, a monitoring system which employs a few video cameras where analog video signals entered through the video cameras are output to a plurality of monitors of a control system, has been used as a remote monitoring system in a relatively small building.

For such a monitoring system, a camera control system in which a plurality of cameras are connected to a local area network (LAN) or an existing digital network including ISDN or other public digital circuits has been proposed.

A camera control system has also been proposed in which cameras can be controlled via a network. In this system, a personal computer, a workstation, or other type of computer is used as the terminal for controlling the cameras so as to implement video display and camera control by a graphical user interface (GUI).

The foregoing proposed system provides an advantage in that even a person not familiar with computers can easily handle the system. In particular, the ease of operation has been improved by displaying camera images on a monitor, and by the camera control panel outputting the camera images at the same time.

In the conventional systems, however, the formats of control signals or the like differ according to the type (or specifications) of the cameras. For this reason, the number of types of cameras that can be connected for control has been restricted or it has been necessary for users to be aware of the type of cameras when carrying out camera control.

SUMMARY OF THE INVENTION

Accordingly, the present invention has been made with a view toward solving the problems described above, and it is an object thereof to provide a system which permits a variety of types of cameras to be connected thereto, and makes it possible to control a plurality of cameras by using standardized camera control commands to enable a user to control a plurality of cameras without worrying about the difference in type of cameras connected thereto. Another object is to provide a system capable of supplying the information on the cameras connected to a user end.

To these ends, according to one aspect of the present invention, there is provided a computer terminal for controlling a video camera in accordance with a control signal received via a network, the computer terminal being equipped with: storing means for storing the information on a video camera connected to the computer terminal; a plurality of modules which convert the control signals into control signals which differ in format from each other; and selecting means for selecting a module among the plurality of modules according to the information on the video camera stored by the storing means to carry out conversion to the control signal matched to the video camera so as to enable the control of the video camera.

In a preferred form of the present invention, the computer terminal further includes outputting means for supplying the information of the video camera that has been determined by determining means to a client.

According to another aspect of the present invention, there is provided a control method of a computer terminal for controlling a video camera in accordance with a control signal received via a network, the control method including the steps of: storing the information of a video camera connected to the computer terminal; a plurality of modules which convert the control signals into control signals which differ in format from each other; and selecting a module matched to the video camera among a plurality of modules, which module converts the received control signals to the control signals differing from each other in format to enable the control of the video camera, according to the information on the video camera stored by the storing means.

According to still another aspect of the present invention, there is provided a control method of a camera control system for enabling the control of a video camera connected to a computer terminal by supplying a control signal via a network, the control method including the steps of: outputting the request for information of the video camera to a plurality of computer terminals by broadcast; and receiving the information of the video camera from the computer terminals.

According to a further aspect of the present invention, there is provided a storage medium which stores a program for implementing the processing of a camera control system controlling the video cameras connected to a plurality of computer terminals in accordance with a control signal supplied via a network, the storage medium storing a program for causing a computer to carry out the processing of: outputting a request for information regarding the video cameras by broadcast to the plurality of computer terminals; clocking the time from the moment the request for the information regarding the video camera was issued in the outputting step; and receiving the information regarding the video camera from the computer terminals until it is indicated in the clocking step that a predetermined time has elapsed.

Other objects and features of the present invention will be more apparent in the following description and the accompanying drawings.

DESCRIPTION OF THE PREFERRED EMBODIMENT

The embodiments of the present invention will now be described in conjunction with the accompanying drawings.

First Embodiment

Figure 1:
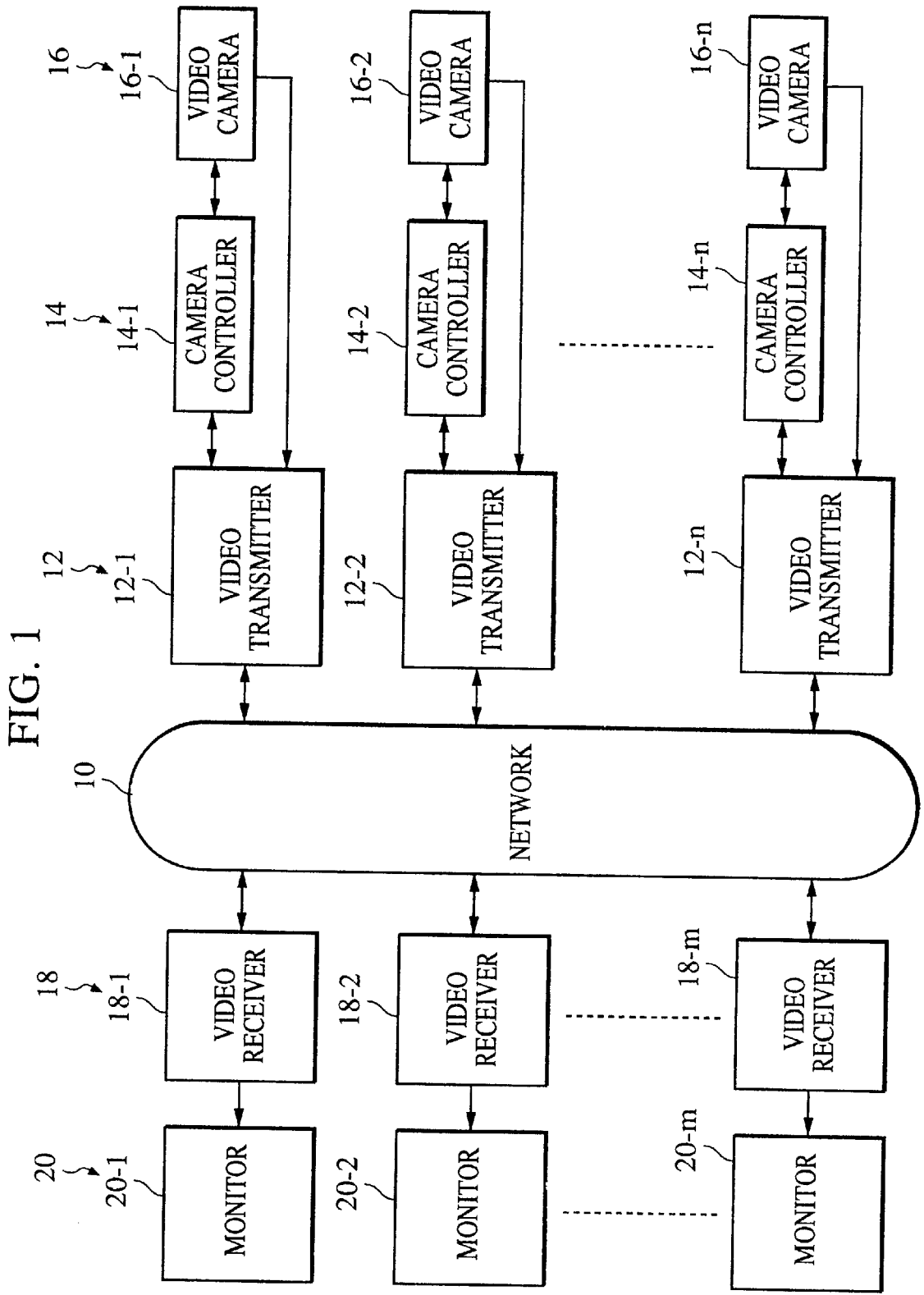
FIG. 1 is a block diagram of a camera control system.

FIG. 1 is a block diagram schematically showing the constitution of a camera control system in accordance with a first embodiment. Reference numeral 10 denotes a network such as a LAN for digitally transmitting video data and camera control information including status information. Connected to the network are an "n" number of video transmitters or camera servers 12 (12-1 through 12-n).

Cameras 16 (16-1 through 16-n) are connected via camera controllers 14 (14-1 through 14-n) to the video transmitters 12 (12-1 through 12-n) constituted by computer terminals or other information processing units. The camera controllers 14 (14-1 through 14-n) are capable of panning, tilting, zooming, focusing, and controlling irises of the video cameras 16 (16-1 through 16-n) in accordance with the control signals received from the video transmitters 12 (12-1 through 12-n).

Electric power is supplied to the video cameras 16 (16-1 through 16-n) from the camera controllers 14 (14-1 through 14-n); the camera controllers 14 (14-1 through 14-n) are capable of turning ON/OFF the power of the video cameras 16 (16-1 through 16-n) according to external control signals.

Further connected to the network 10 are video receivers or camera clients 18 (18-1 through 18-m) which receive and display the video information transmitted from the video transmitters 12 (12-1 through 12-n) to the network 10. Monitors 20 (20-1 through 20-m) such as bit map displays or CRTs are connected to the video receivers 18 (18-1 through 18-m).

The network 10 does not have to be wired; it may alternatively be a wireless network utilizing a wireless LAN unit. In this case, the video receiver 18 may be made integral with the monitor 20 to provide a portable video receiver.

The video transmitters 12 (12-1 through 12-n) compress the output video signals of the connected cameras 16 (16-1 through 16-n) in a predetermined compression format (e.g. H.261) before sending them to the video receiver 18 of a requesting party or to all video receivers 18 via the network 10.

The video receivers 18 are capable of controlling the turning ON/OFF of the supply of power in addition to a variety of parameters such as videotaping direction, videotaping magnification, focusing, and irising of the desired camera 16 via the network 10, the video transmitters 12, and the camera controllers 14.

The video transmitters 12 can be made so that they also serve as the video receivers by connecting monitors thereto and providing video expanding units for expanding compressed video data. Likewise, the video receivers 18 can be made so that they also serve as the video transmitters by connecting the camera controllers 14 and the video cameras 16 and providing video compressing units. These transmitters and receivers are equipped with storage devices such as ROMs for storing the software necessary for transmitting or receiving video data.

Figure 2:
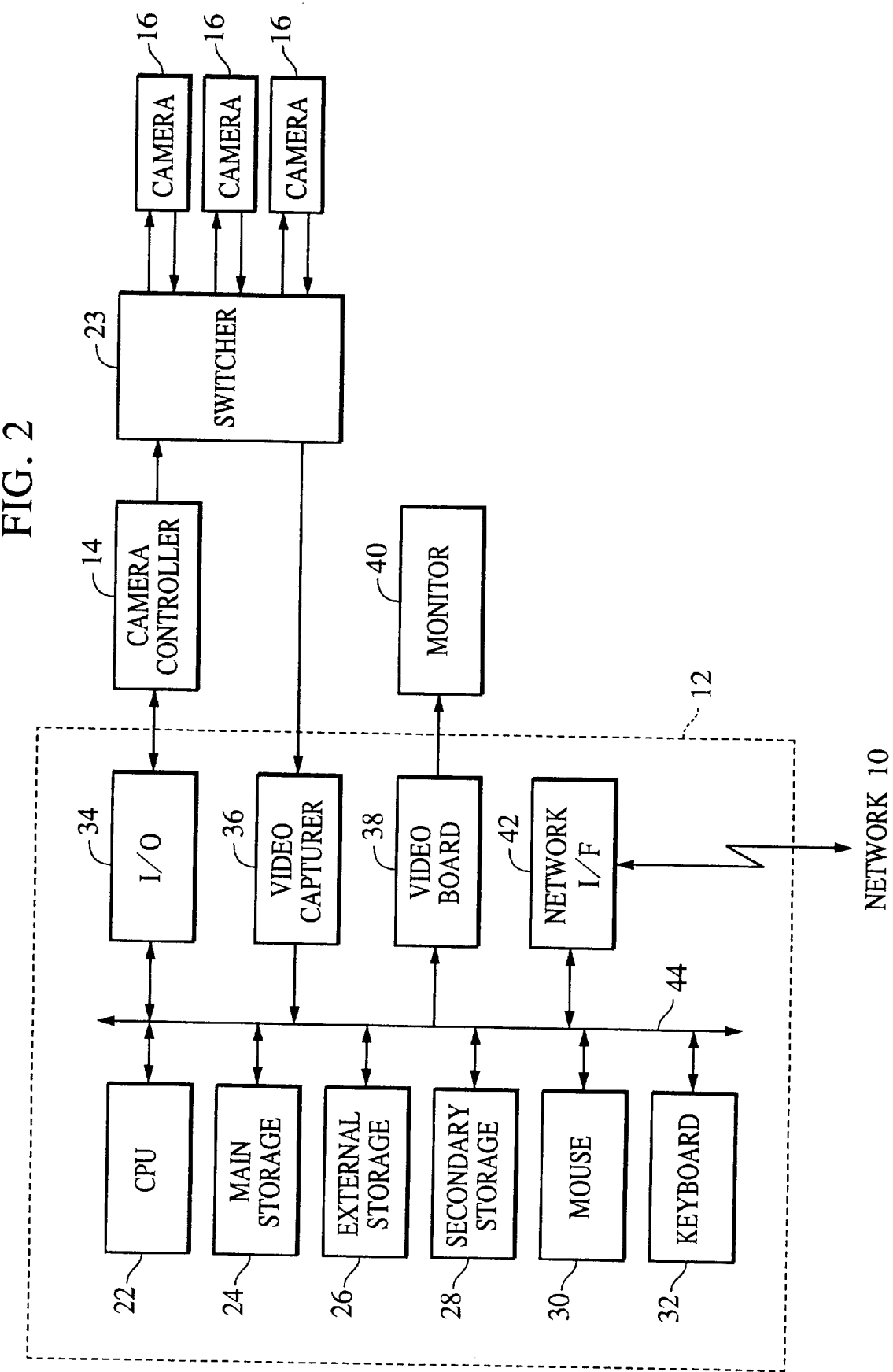
FIG. 2 is a block diagram showing the constitution of a video transmitter.

FIG. 2 is a block diagram showing the schematic configuration of the video transmitter 12 which includes: a CPU 22 for integrally controlling the entire video transmitter 12; a main storage 24 (RAM); an external storage 26 such as a floppy disk, CD-ROM, etc. which are removable; a secondary storage 28 such as a hard disk; a mouse 30 serving as a pointing device; a keyboard 32; an I/O board 34 to which a camera controller is connected to transmit and receive camera control signals therethrough; and a video capturer 36 for capturing the video output signals of the video cameras 16.

The video capturer 36 in this embodiment is equipped with an A-D converting function for converting analog video signals to digital signals and a video compressing function for compressing video information. Further included in the video transmitter are a video board 38 for displaying video information on a monitor 40; a network interface 42; and a system bus 44 for interconnecting the foregoing components in the video transmitter 12. If the video transmitter 12 is used exclusively for video transmission, then the video board 38 and the monitor 40 can be omitted.

A switcher 23 selectively switches among a plurality of connected cameras to transmit video data or to be controlled.

The video transmitter 12 thus configured issues video signals to video receiver 18 at a remote location via the network 10 and also controls such operations as panning and tilting of the cameras 16 in response to the camera control signals received from the video receiver 18.

Figure 3:
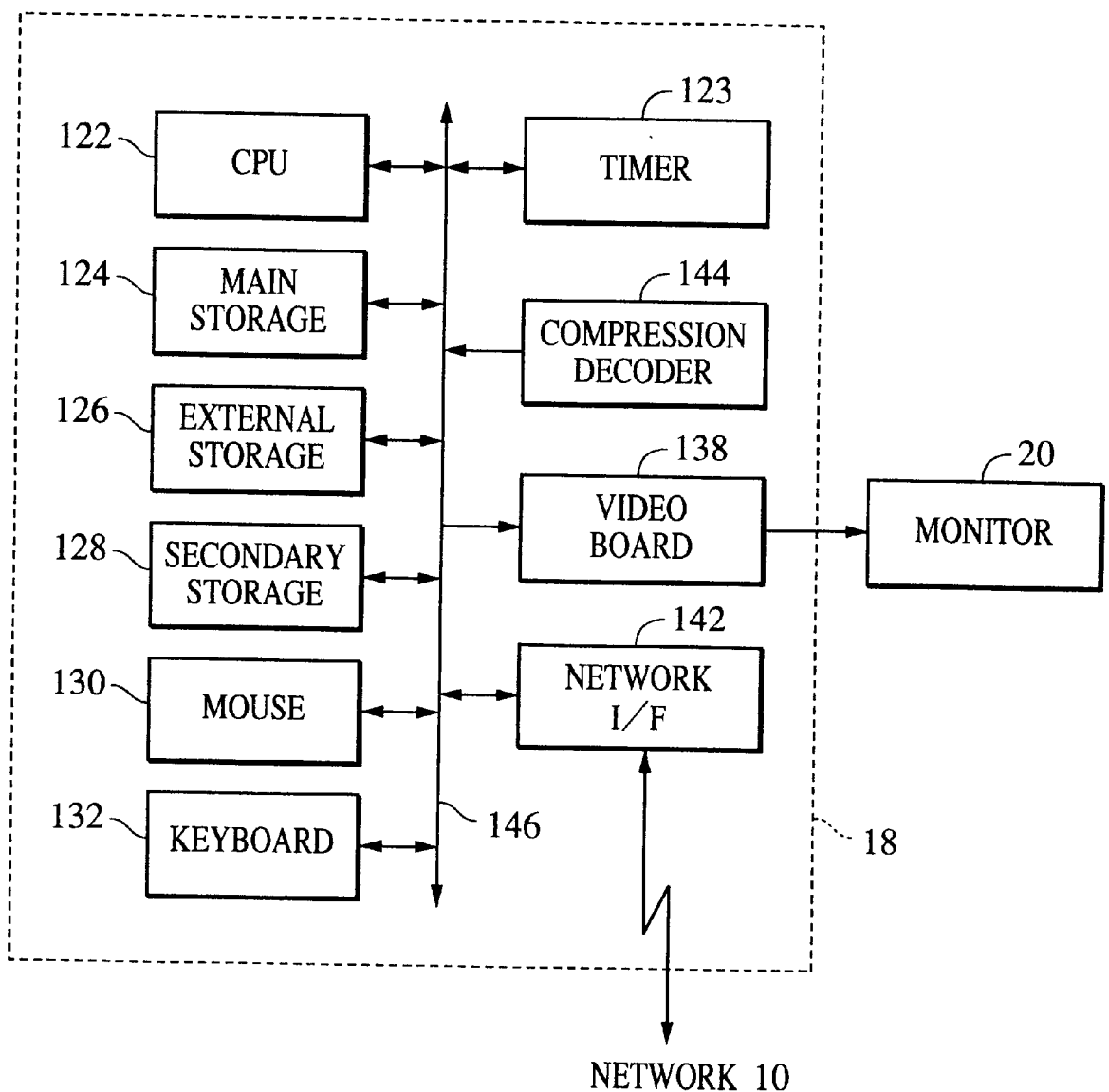
FIG. 3 is a block diagram showing the constitution of a video receiver.

FIG. 3 is a block diagram showing the schematic configuration of the video receiver 18 composed of a computer terminal or other information processing units. The video receiver shown in FIG. 3 includes: a CPU 122 which integrally controls the entire video receiver 18; a main storage 124 (RAM); a removable external storage 126 such as a floppy disk or CD-ROM which is removable; a secondary storage 128 such as a ROM or hard disk; and a timer 123 which clocks time according to a command received from the CPU.

Further included in the video receiver are: a keyboard 132; a mouse 130 serving as a pointing device; a video board 138 for displaying video information on a monitor 20; a network interface 142; a compression decoder 144 for expanding compressed video information; and a system bus 146 for interconnecting the foregoing components making up the video receiver 18.

The video receiver 18 shares the same constitution as that of the video transmitter 12 shown in FIG. 2 except that it does not have the function for capturing the camera images obtained by controlling the cameras 16, that it is equipped with the decoder 144 for expanding compressed pictures, and that it has different system software; hence, the description of the common portion will be omitted. If the software for the video transmitter is built into the video receiver 18, then it is able to transmit, via a network a video output signal to a desired video receiver 18 or the one authorized to control the cameras 16.

The video receiver 18 transmits the camera control signals to the video transmitter 12, and the video transmitter 12 which received the camera control signals controls the cameras 16 in accordance with the contents of the camera control signals and also sends the current statuses of the cameras 16 back to the video receiver 18. The video receiver 18 receives the video data sent from the video transmitter 12 and carries out predetermined processing to display the videotaped images on the display screen of the monitor 20 in a real-time mode.

Figure 4:
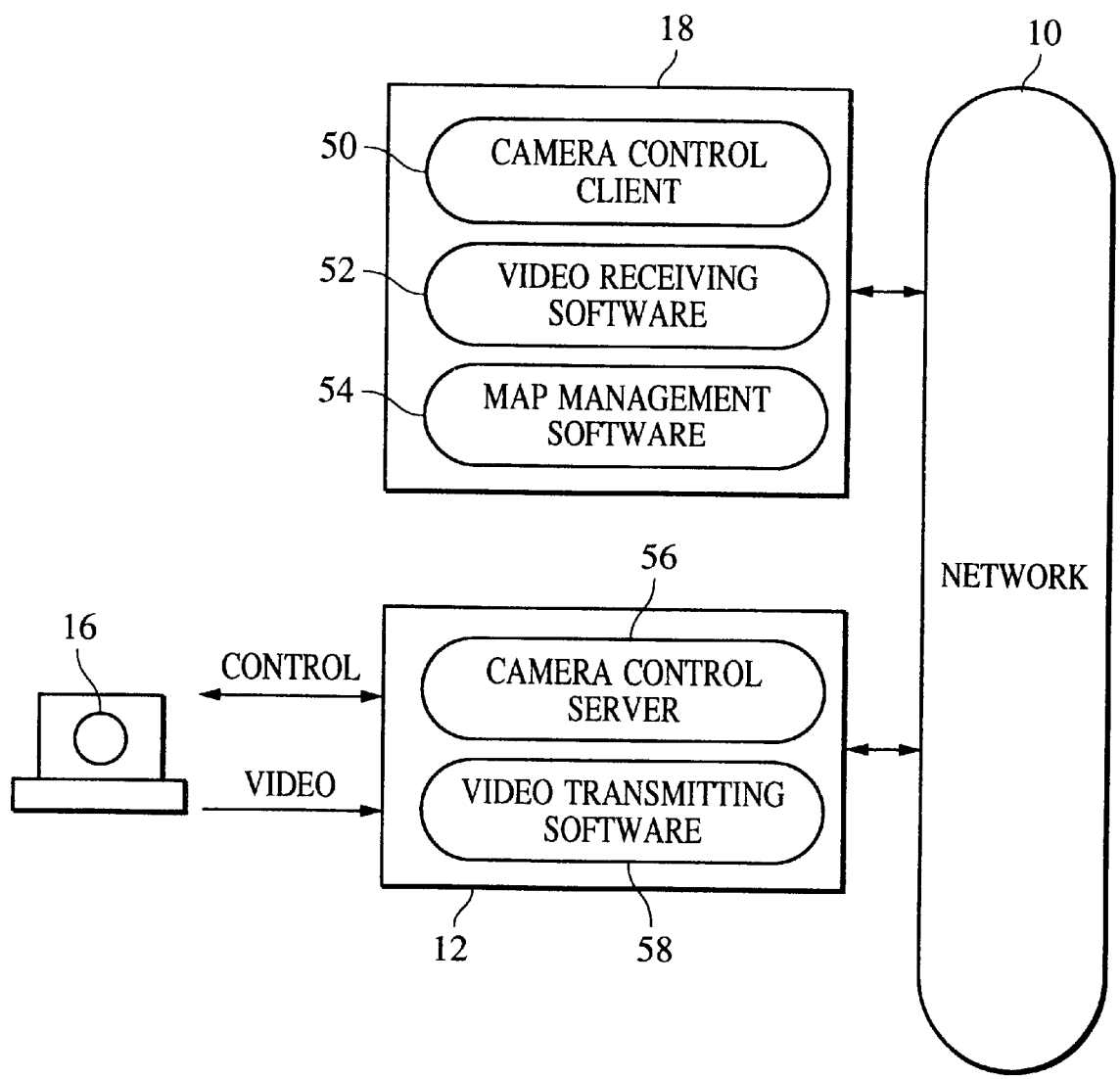
FIG. 4 is a block diagram of the software of the camera control system.

FIG. 4 is a block diagram of the software in the camera control system of this embodiment. In the video receiver 18, stored in the secondary storage 128 are: a camera control client (software) 50 for accessing the video transmitter 12 via the network 10 to remotely control the cameras 16; video receiving software 52 for expanding the compressed video data received from the video transmitter 12 to display it on the monitor screen; and map management software 54 for displaying the locations and current statuses of the respective cameras 16 on a map in the form of camera symbols.

The video receiving software 52 controls the cameras 16 connected to all the video transmitters 12 connected to the network 10; it has fixed information and a variety of types of variable information on the cameras 16. The variable information includes, for example, the names of the cameras, the host names of the computers to which the cameras 16 are currently connected, the camera statuses such as panning, tilting, and zooming, whether the cameras can be controlled, which one of the cameras 16 is being currently controlled, or the image of which camera 16 is being currently displayed. These pieces of information are also supplied to the camera control client 50 and the map management software 54 to be used primarily for changing the displayed camera symbols.

In the video transmitter 12, stored in the secondary storage 28 are: a camera control server (software) 56 for controlling the cameras 16 via the camera controllers 14 built in the cameras 16 in response to a request received from the camera control client 50 and for notifying the requesting party of the current information such as the service statuses of the cameras 16; and video transmitting software 58 for compressing the output images of the cameras 16 and for transmitting the compressed images in a predetermined format to the requesting party via the network 10.

Figure 8:
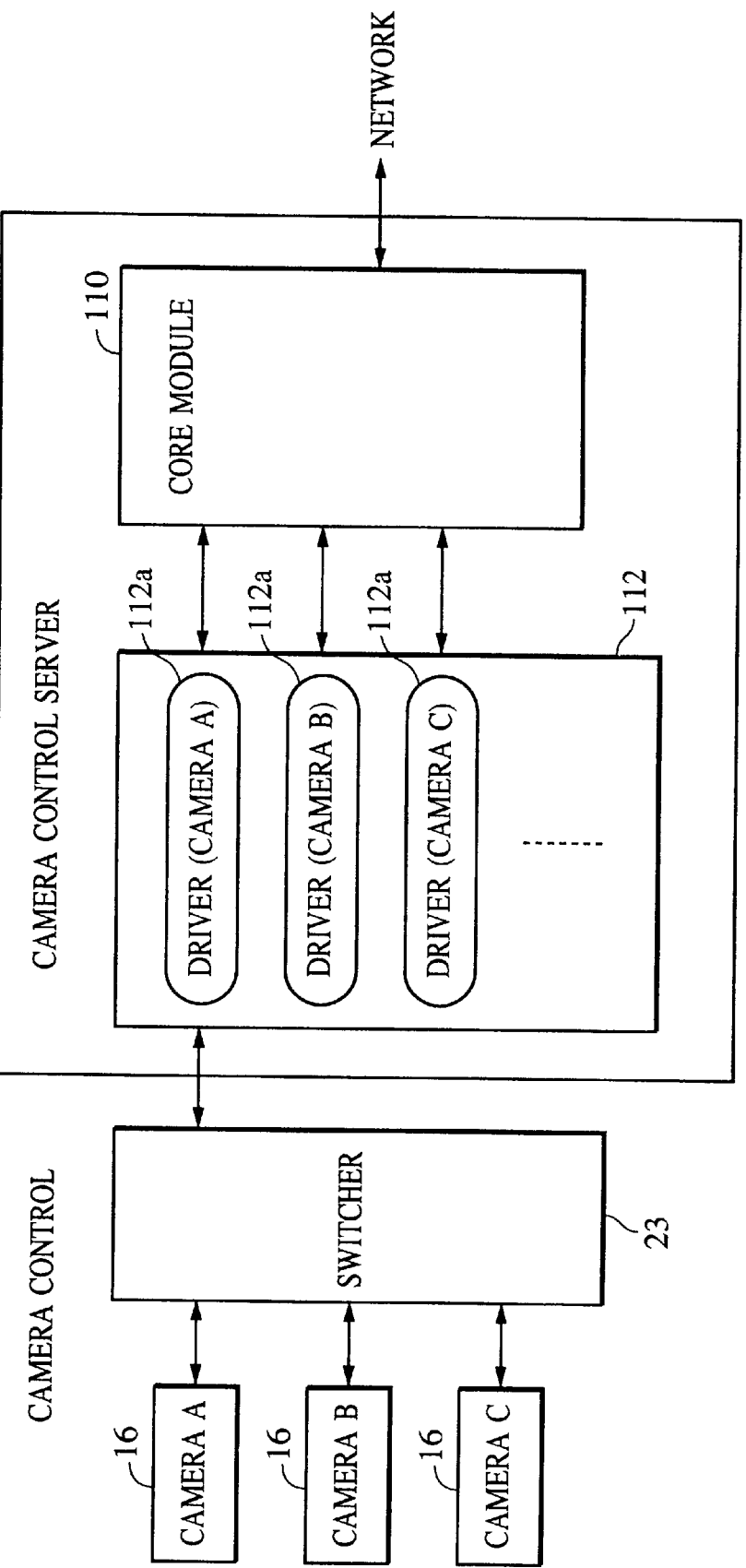
FIG. 8 is a diagram showing the details of the construction of a camera control server (56)

FIG. 8 shows the details of the construction of the camera control server 56 in accordance with the embodiment. A core module 110 receives standard control signals transmitted from the video receiver 18 via the network, and checks the received standard control signals to pick up the one commonly used for controlling all the cameras 16 regardless of the types of the cameras (in other words, one that does not depend on the type of camera), and executes the control signal processing.

Modules 112a through 112c and so on execute, for example, the processing of the control signals peculiar to camera A, camera B, camera C, and so on.

More specifically, if the camera control server 56 recognizes that the connected camera 16 is, for instance, camera A, then the camera control server 56 selectively uses module A to carry out the signal processing peculiar to camera A to convert the control signal to one in the format matched to camera A before supplying it to camera A. In FIG. 8, the switcher 23 is used; hence, a plurality of cameras 16 can be connected. In this case, the module keyed to the camera 16 which is controlled by the video receiver 18 will be selected.

Implementing the aforesaid processing makes it possible to handle the case where the signals supplied to the network are in a predetermined common format.

Figure 9:
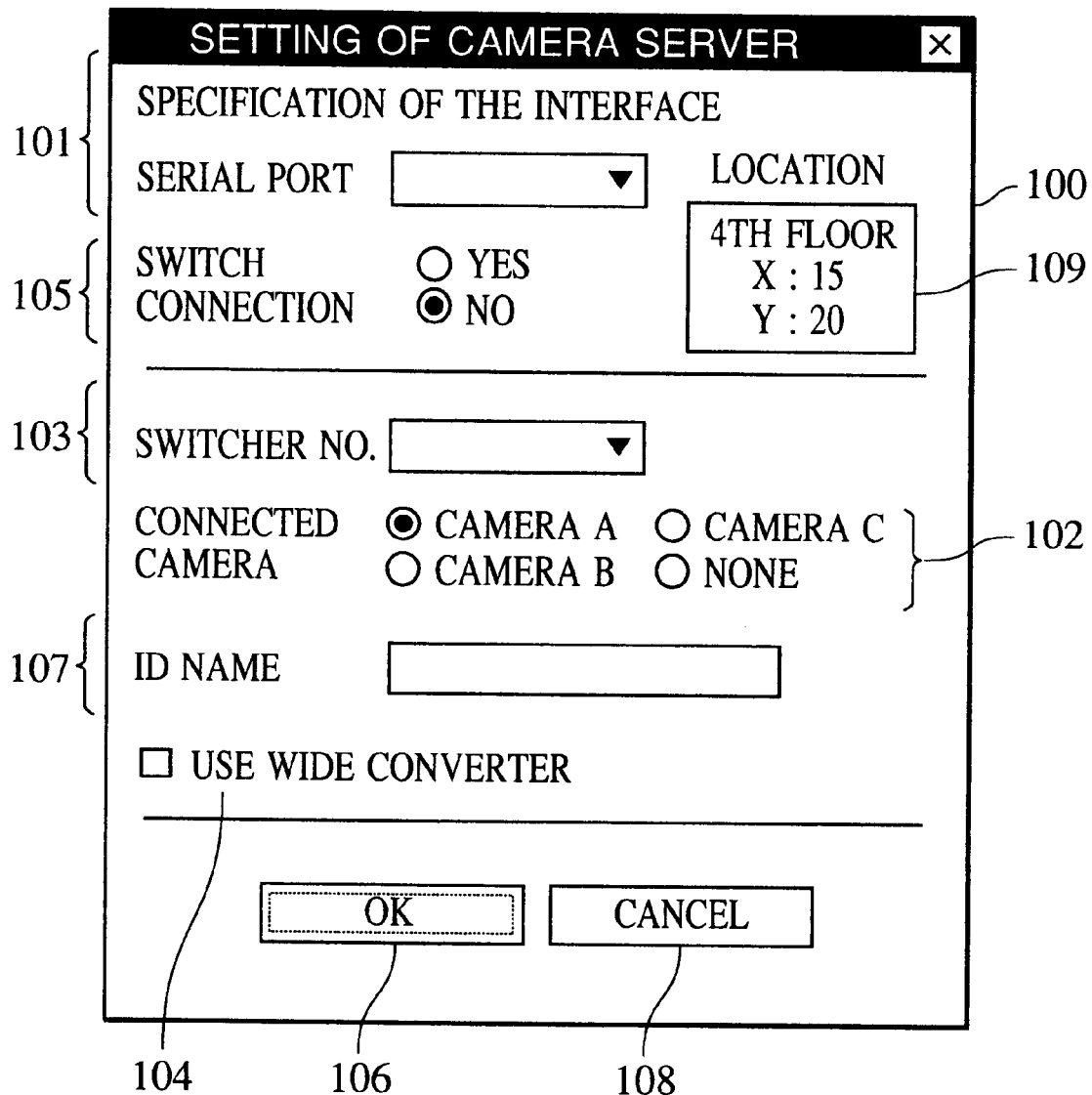
FIG. 9 is a diagram showing an example of the monitor screen of a video transmitter (12)

FIG. 9 shows an example of a setting panel displayed on the screen of the monitor 40. Through the setting panel, the connecting configuration can be entered from the video transmitter (camera server) 12 to prepare for operating the camera system in accordance with the embodiment so as to allow the camera control server 56 to recognize the connecting configuration of the peripherals of the video transmitter 12 including the types of the connected cameras 16.

A setting panel 100 is used to enter the information on the cameras 16 connected to the video transmitter. In the setting panel 100, an input section 102 makes it possible to select and enter the type of the cameras connected to video transmitter 12. The input section 102 enables the camera control server 56 to recognize the types of the three cameras and the absence of connected cameras in FIG. 9; however, it may be configured also to permit recognition of different types of cameras.

An input section 101 enables the input of the specifications of the interface such as RS-232-C or IEEE1394 for the transmission between the video transmitter 12 and the cameras 16. The modules 112a through 112c and so on are matched to the types of cameras to be connected and the control signals are converted to the ones in the format conforming to the specifications of the entered interface.

If the RS-232-C is entered through the input section 101, then the port number or the connector number of the RS-232-C, is further specified.

Further, the input section 105 allows an input indicative of whether there are a plurality of cameras 16 connected to the video transmitter 12 and whether the video transmitter 12 employs the switcher 23 which permits the change of the connection of the cameras 16.

When a plurality of cameras 16 are connected by employing the switcher 23, the input section 103 makes it possible to enter the connection terminal Nos., i.e. the switcher Nos., of the connection terminals at which the respective cameras are connected to the switcher 23 and the types of the cameras 16 connected to be entered. An input section 107 enables the identification names of the cameras to be entered. Entering the coordinates on the map through the input section 107 enables the video transmitter 12 to recognize the positions of the cameras 16 to be connected.

Whether a wide angle converter is available is specified through an input section 104.

A determination button 106 is pressed to determine the inputs made through the input sections on the foregoing setting panel 100. When the determination button 106 is pressed, the setting on the setting panel 100 is stored in the core module 110, or in the main storage 24 in FIG. 2, and the drivers matched to the types of the set cameras are selectively used to start the signal processing. The current panning and tilt angles and the current zooming magnification are stored also in the core module 110. A cancel button 108 is pressed to cancel the input made through the setting panel 100. A location input section 109 allows detailed input about the locations where the cameras 16 are installed; in FIG. 9, the locations of the cameras 16 are recognized by entering which floor of a building and the coordinates (X,Y) of the floor where the cameras are installed.

Figure 5:
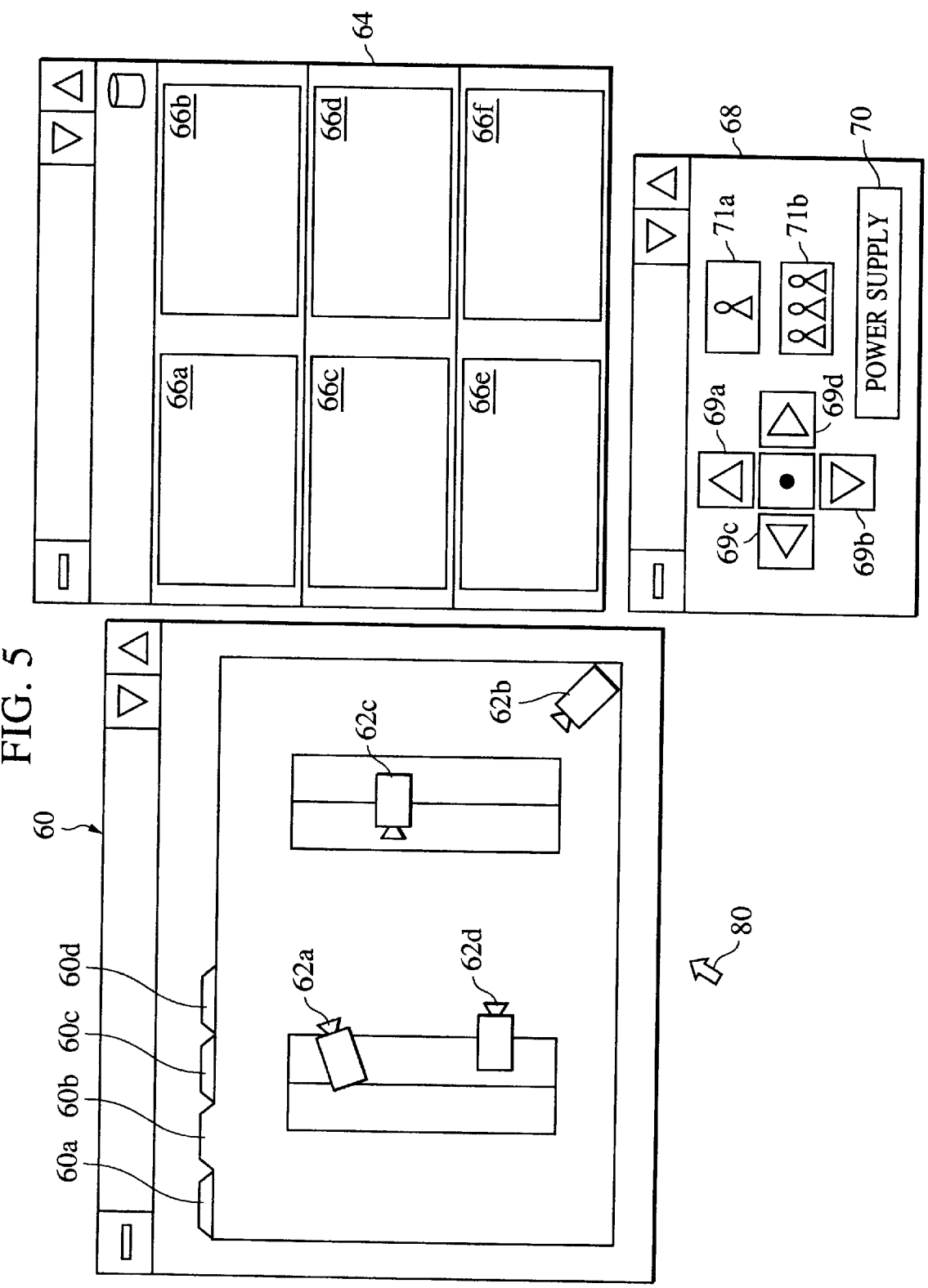
FIG. 5 is a diagram showing an example of the contents displayed on the monitor screen of a video receiver (18)

FIG. 5 shows an example of the contents displayed on the monitor screen of the video receiver 18; wherein a map window 60 shows the layout of an office, shop, warehouse, or the like where a plurality of cameras 16 are located. The map window includes a plurality of maps 60a, 60b, 60c, and 60d which can be switched. There is no particular restrictions on the number of the displayable maps 60a, 60b, 60c, and 60d because it depends on the performance of the system.

The maps 60a, 60b, 60c, and 60d have tabs as illustrated in FIG. 5; and a cursor 80 is moved by the mouse 130 to click the tab of the desired map so as to bring the selected map to the front.

Camera icons 62a, 62b, 62c, and 62d displayed on the map windows 60 are oriented such that they are keyed to the shooting directions of the corresponding cameras 16.

A video display window 64 is equipped with video display areas 66a through 66f where the pictures received from the cameras 16 are displayed. Reference numeral 66g on the video display window 64 is the recycle bin icon for terminating the video display.

Figure 6:
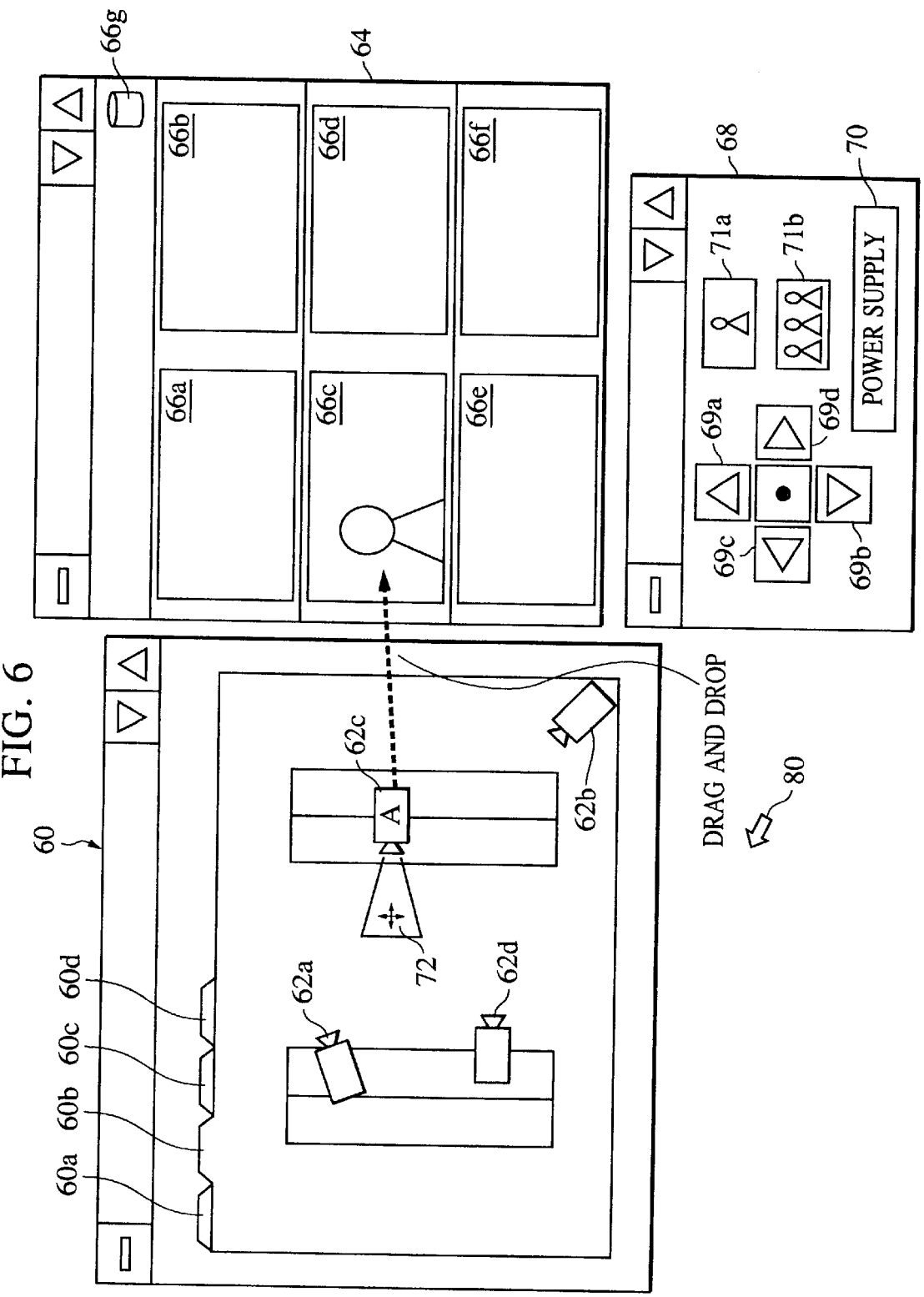
FIG. 6 is a diagram showing another example of the contents displayed on the monitor screen of the video receiver (18)

FIG. 6 shows a taken picture of the camera 16 corresponding to the camera icon 62c, which picture is displayed in the video display area 66c, when the camera icon 62c is dragged to and dropped in the video display area 66c.

Thus, when a user wishes to display the picture of a certain camera 16, the user selects the camera icon 62 indicating that particular camera 16 on the corresponding map of the map window 60, and drags and drops the camera icon 62 into one of the video display areas 66a through 66f of the video display window 64. This permits the picture to be displayed.

Figure 7:
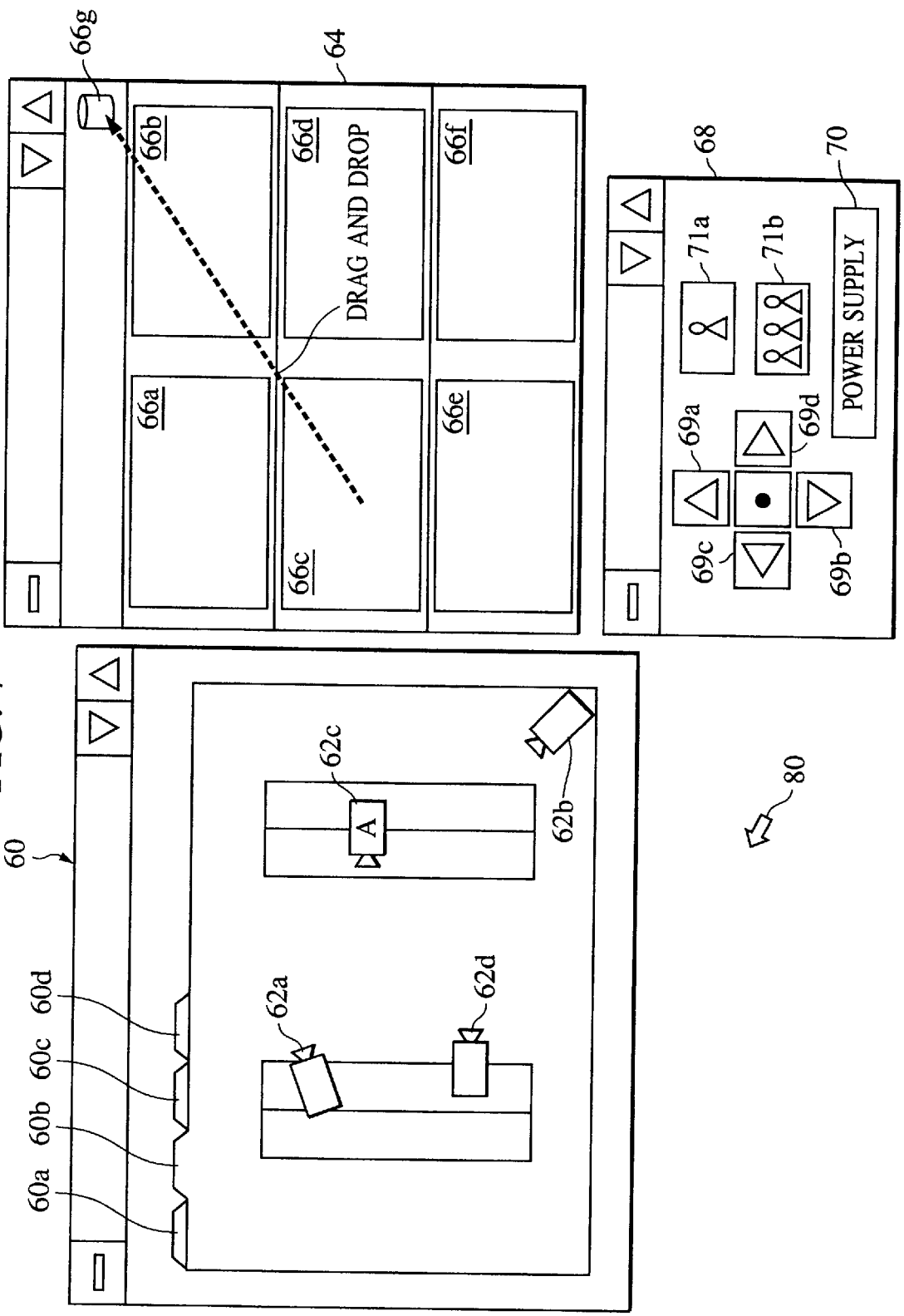
FIG. 7 is a diagram showing yet another example of the contents displayed on the monitor screen of the video receiver (18)

To terminate the display of the picture, the video display area where the picture which is to be terminated is being displayed is dragged and dropped into the recycle bin icon 66g as shown in FIG. 7. This completes the termination of picture display.

The operation for carrying out camera control will now be described. The cursor 80 is moved by using the mouse into the video display area where the picture of the camera to be controlled is being displayed among the video display areas 66a through 66f wherein the pictures are being displayed by the foregoing operation, then the selected video display area is clicked. This causes a camera control window 68 to be displayed so as to enable the camera to be controlled. At this time, the clicked camera control window 68 is enclosed with a yellow frame to show that it is controllable.

Buttons 69a, 69b, 69c, and 69d are clicked to enter the control commands of the shooting directions of the top, bottom, left, and right cameras 16. A button 71a is used to set the zooming magnifications of the cameras 16 in the tele-direction, and a button 71b is used to set the zooming magnifications of the cameras 16 in the wide-direction. A button 70 is for turning ON/OFF the power of the cameras 16.

Figure 10:
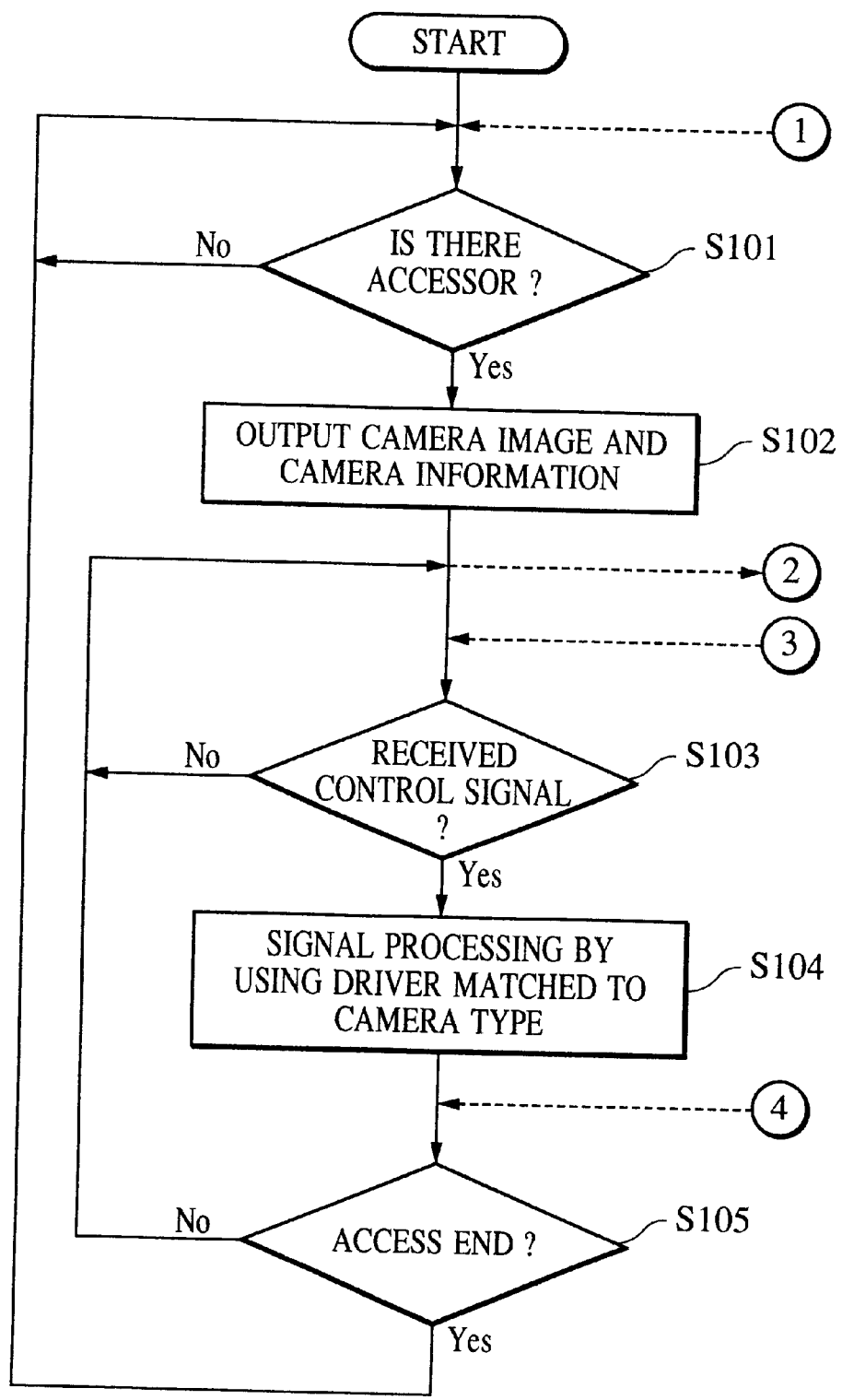
FIG. 10 shows a flowchart illustrating the operation processing of the video transmitter in accordance with a first embodiment.
Figure 11:
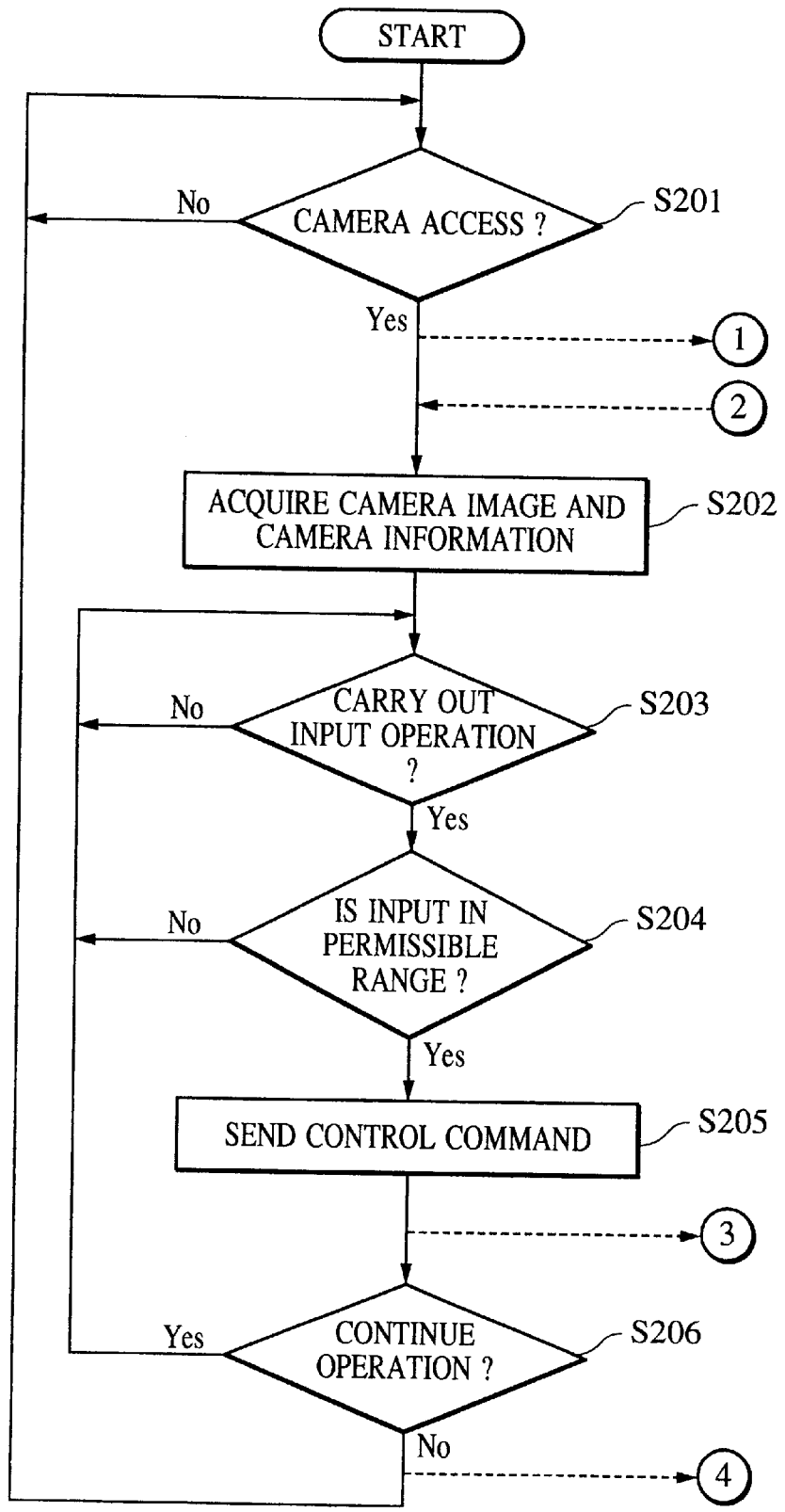
FIG. 11 shows a flowchart illustrating the operation processing of a first video receiver.

FIGS. 10 and 11 show the flowcharts of the operation processing of the video transmitter or the camera server 12 and the video receiver or the camera client 18. The program for conducting the control of the video receiver 18 is stored in the secondary storage 128; it is loaded into the main storage 124 at the time of execution and run by the CPU 122. The program for carrying out the control of the video transmitter 12 is stored in the secondary storage 28; it is loaded into the main storage 24 at the time of execution and run by the CPU 22.

First, in step S201 of FIG. 11, the drag and drop operation is performed as illustrated in FIG. 6 to implement camera access. Then, the program proceeds to ① of FIG. 10 to determine in step S101 whether there is a camera accessor at the video transmitter 12.

If it is determined that there is a camera accessor, then the camera video data is output to the accessing video receiver 18 by the video transmitting software 58 in step S102. At the same time, the information on the cameras which has been stored in the core module 110 shown in FIG. 8 and which includes the types of the cameras currently connected, the associated angular ranges in which the cameras can be panned or tilted, the maximum and minimum zooming magnification values, and the current panning or tilting angles and the current zooming magnification values is supplied to the video receiver 18.

The program then goes back to FIG. 11 where it proceeds to ② of the operation processing flowchart of the video receiver 18 to acquire the video data of the cameras and the information on the cameras in step S202. Thus, as shown in FIG. 6, the camera image based on the received video data is displayed in the video display area 66c by the processing implemented by the video receiving software 52.

Further, the map management software 54 carries out processing to change the camera display format so as to allow the type of the connected camera to be recognized and indicated by the camera icon 62c on the map window 60. In FIG. 6, based on the information output from the video transmitter, the program has made the camera: icon 62c indicate that the camera is type A.

A scope 72 functions to indicate the shooting direction and viewing angle of the camera 16. When the control signal is issued to the camera 16, a camera module 112 inquires of the camera 16 the current shooting direction, and the camera 16 supplies the information on the direction and zooming magnification to the current camera module 112 in the format which depends on the type of camera. Based on the supplied information, the camera module 112 outputs the information in the standardized format (which does not depend on the type of camera) to the video receiver 18. At this time, the calculation of the viewing angle is switched according to the setting made by the button 104, that is, according as whether the wide angle converter is attached or not.

The information obtained by such calculation is supplied to the video receiving server 18, and the display of the scope 72 is performed by the map management software 54 in accordance with the received information including the shooting direction, viewing angle, and zooming magnification.

In step S203, when the camera control command is entered by pressing a button on the camera control panel 68, the camera control client 50 checks whether the control command is in the permissible or controllable range (the range in which the shooting direction of panning or tilting, or the zooming magnification can be controlled) for the type of the camera 16 currently connected, according to the information on the camera obtained in step S202.

In step S204, if it is determined that the control command is out of the permissible range, then the program goes back to step S203; or if it is determined that the control command is in the permissible range then the control command supplied to the video transmitter 12 to which the camera 16 to be controlled is connected is issued.

The control command employs the standardized control command which does not depend on the type of cameras 16. For instance, in the case of the zoom command, the maximum and minimum zooming magnification depends on the type of camera; therefore, the command is transmitted using the viewing angle value which does not depend on the type of camera. Likewise, in the case of a shooting direction control command, a command employing the angle based on the horizontal direction and the perpendicular direction is transmitted.

Then, the program proceeds to ③ of the operation processing flowchart of the video transmitter 12 of FIG. 10. In step S103, upon receipt of the control signal, the core module 110 in the camera control server 56 selects the camera module 112 compatible to the connected camera 16 (in FIG. 6, camera type A is connected, so that the camera module 112a capable of performing the conversion to the command for camera type A is selected) to implement the operation processing. If a plurality of cameras 16 are connected by using the switcher 23, then the camera module 112 compatible to the camera 16 is selected by the video receiver 18.

In step S104, the camera module 112 converts the received standardized command to a type-dependent command that can be interpreted by the connected camera 16 according to the command correspondence, table which has been stored in advance, so as to control the camera 16.

The program goes back to the flowchart of FIG. 11 and in step S206; when the operation of the camera 16 needs to be terminated, the video display area is dragged and dropped in the recycle bin icon 66g to terminate the operation. The program then proceeds to ④ of the flowchart of FIG. 10, and when the access is terminated in step S105, it stops the output of the camera video data.

As described above, at the video receiver or camera client 18, since the standardized camera control signals are sent to the video transmitter or camera server 12, the camera operator does not have to worry about the difference in type of camera. This makes it possible to carry out uniform camera control regardless of the type of connected cameras.

Second Embodiment

A second embodiment is adapted to automatically detect, at the video receiver or camera client 18, the information regarding the camera connected to the video transmitter or camera server 12, including the type of camera, the location where the camera is installed, the performance of the camera (such as the permissible ranges of the shooting range and zooming magnification), the current shooting direction and zooming magnification, and the current control status, either at the time when the system is activated or at regular intervals.

The constitution of the camera control system of this embodiment is the same as that of the first embodiment and the description thereof will be omitted.

Figure 12:
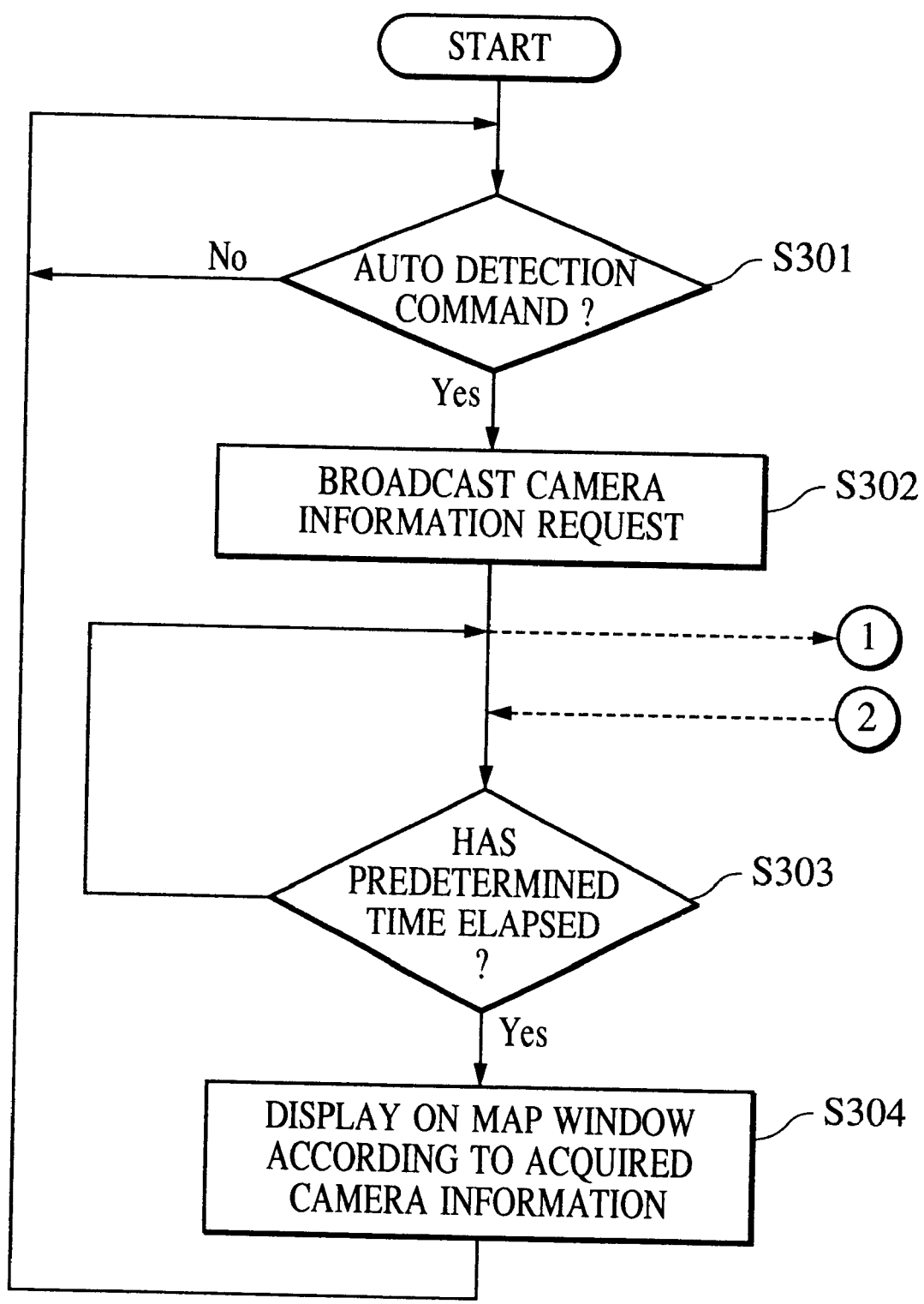
FIG. 12 shows a flowchart illustrating the operation processing of a second video receiver.
Figure 13:
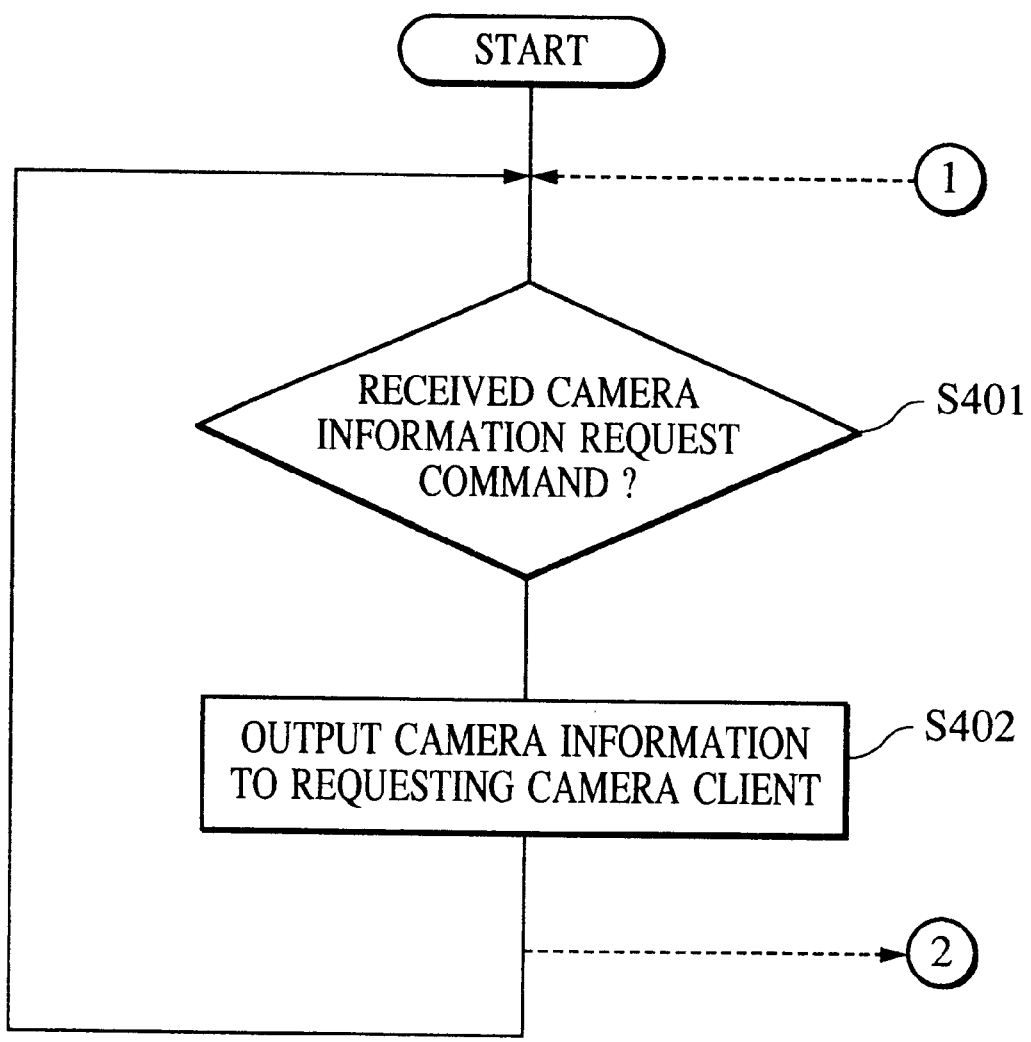
FIG. 13 shows another flowchart illustrating the operation processing of the second video transmitter.

FIGS. 12 and 13 show the operation processing flowcharts of the video receiver or the camera client 18 and the video transmitter or the camera server 12. The program for carrying out the control of the video transmitter 12 to be described below is stored in the secondary storage 28; the program is loaded into the main storage 24 at the time of execution and implemented by the CPU 22. Likewise, the program for carrying out the control of the video receiver 18 is stored in the secondary storage 128; it is loaded into the main storage 124 at the time of execution and run by the CPU 122.

In this embodiment, an automatic detection command is generated when the video receiver 18 is actuated or at fixed intervals after the actuation. First, in step S301 of FIG. 12, when the automatic detection command is generated in the case mentioned above, the camera control client 50 broadcast-transmits, in step S302, the request for the information on the cameras to the video transmitters 12 connected to the network.

In the second embodiment, the addresses of other network segments involved in the broadcast transmission are set beforehand and saved in the secondary storage 28 or the like so that the setting can be read out and broadcast-transmitted at the time of execution.

The program then goes to ① of FIG. 13 and in step S401, when the request for camera information is received by the video transmitters or camera servers 12, it sends out in step S402 the information on the cameras, which has been stored in the core module 110 and which includes the types of the connected cameras 16, the locations where the cameras 16 are installed, the performance of the cameras 16 including the shooting ranges and the permissible ranges of the zooming magnifications, and the current control statuses, to the requesting video receiver or camera client 18.

The video transmitters or camera servers 12 set and hold the client addresses which are the output destinations of the information on the cameras.

The program proceeds to ② of FIG. 12 and in step S303, it receives the information on the cameras from the video transmitters 12 connected to the network until a predetermined time elapses from the moment the request for the information on the cameras was broadcast-transmitted. The time is clocked by the timer 123. The term "broadcast-transmit" refers to a technique whereby a command is transmitted simultaneously to all terminals on the network without specifying any particular party.

In step S304, based on the information on the cameras received within the predetermined time following the broadcast-transmission, the map management software 54 reflects the display of the camera icons on the map window 60. If the information on a particular camera 16 has not been received within the predetermined time, then the program decides that an error has occurred and gives an indication to that effect.

For instance, the program displays the camera icons 62 for the acquired locations where the cameras 16 are installed, and displays the shooting directions of the camera icons 62 and the scope 72 for the acquired current shooting directions. The program also displays the camera icons 62, distinguishing the cameras 16 currently under control from the cameras not currently under control in accordance with the acquired control statues of the current cameras 16. Further, the program displays the camera icons 62 according to the acquired types of the cameras 16.

As an alternative, a user may issue the command for the automatic detection of the information on cameras to implement the automatic detection.

Thus, in this embodiment, the information on the cameras held by the video transmitters 12 connected to the network can be obtained at the video receivers or camera clients 18. This enables the user to acquire the information on the cameras connected to the network. Furthermore, the acquired information on the cameras is reflected on the camera icons 62 on the map window 60, enabling the user to recognize the present statuses of the connected cameras at a glance. In addition, since the video receivers 18 receive the information on the cameras at fixed time intervals rather than receiving it at all times, the traffic of the network can be reduced.

In the embodiments described above, the same advantages can be obtained by supplying a recording or storing medium, to which the program codes of the software for implementing the functions of the camera control system have been recorded, to the system or apparatus so that the computer or CPU or MPU of the system or apparatus reads out the program codes stored in the storage medium to implement them.

In this case, the program codes themselves are read out from the recording medium to carry out the functions of the embodiments, and hence the storage medium comprises the present invention.

The storage medium for supplying the program codes includes, for example, a floppy disk, hard disk, optical disk, magneto-optical disk, CD-ROM, CD-R, magnetic tape, non-volatile memory card, and ROM.

The present invention also includes a case where an operating system (OS) or the like run on the computer carries out a part or all the actual processing in accordance with the instructions based on the program codes so as to implement the functions of the aforesaid embodiments in addition to a case where the program codes read out by the computer are carried out to implement the functions of the aforesaid embodiments.

Moreover, the program codes read out from the storage medium are written to the memory provided on a feature expansion unit connected to a feature expansion board inserted in the computer or the feature expansion unit connected to the computer, then the CPU or the like provided on the feature expansion board or the feature expansion unit carries out a part or all the actual processing in accordance with the instructions based on the program codes to implement the functions of the aforesaid embodiments.

When applying the processing of the camera control systems of the embodiments to the foregoing storage medium, the program codes based on the flowcharts described above will be stored in the storage medium. Briefly speaking, the modules essential to the camera control systems of the embodiments will be stored in the storage medium.

Thus, a setting is made beforehand at the video transmitters or camera servers to identify connected cameras, so that the standardized commands transmitted from the video receivers or camera clients can be converted to control commands compatible with the connected cameras. This enables the users at the video receivers to control the cameras without worrying about the difference in the types of cameras.

Moreover, the video receivers or camera clients automatically detect the information on cameras and displays are provided on the map window according to the automatically detected information on the cameras received from the video transmitters. This enables the users to recognize the current statuses of the cameras at a glance.

The individual components shown in outline or designated by blocks in the Drawings are all well-known in the camera control arts, and their specific construction and operation are not critical to the operation or best mode for carrying out the invention.

While the present invention has been described with respect to what is presently considered to be the preferred embodiments, it is to be understood that the invention is not limited to the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer terminal for controlling a video camera locally connected to said computer terminal in accordance with control signals received via a network from a remote operator, said computer terminal comprising:
    a plurality of modules which convert control signals received from the network into control signals of different formats, each of said plurality of modules converting received control signals into control signals of a different format corresponding to a different type of camera;
    a setting device that sets a type of the connected video camera corresponding to an input entered on the side of said computer terminal; and
    a selecting device that selects a module from among said plurality of modules to perform a conversion of the received control signals into control signals of a different format to be transmitted to the video camera connected to said computer terminal in accordance with information regarding the set type of the connected video camera.

2. A computer terminal according to claim 1, wherein the information regarding the video camera connected to said computer terminal comprises information regarding the type of video camera.

3. A computer terminal according to claim 1, wherein a plurality of video cameras are connected to said computer terminal, and wherein said memory stores information regarding each of the plurality of video cameras connected to said computer terminal.

4. A computer terminal according to claim 3, wherein said selecting device selects a module corresponding to one video camera from among said plurality of video cameras connected to said computer terminal.

5. A computer terminal according to claim 1, wherein the information regarding the video camera connected to said computer terminal comprises interface specifications for transmitting a signal between said video camera and said computer terminal.

6. A computer terminal according to claim 1, wherein the information regarding the video camera connected to said computer terminal comprises information indicative of the presence of a switcher which permits the connection of a plurality of video cameras to said computer terminal and which selectively switches among video signals from said plurality of video cameras connected to said computer terminal.

7. A computer terminal according to claim 1, further comprising:
    an input device arranged to enter information regarding the video camera connected to said computer terminal, and
    wherein said selecting device determines the information regarding said video camera entered by said input device and stores it in said memory.

8. A computer terminal according to claim 7, wherein said input device inputs an indication of whether a wide angle converter function of said video camera is to be used.

9. A computer terminal according to claim 7, further comprising an output device that outputs the information regarding said video camera determined by said selecting device to another computer terminal.

10. A control method of a computer terminal for controlling a video camera locally connected to the computer terminal in accordance with control signals received via a network from a remote operator, comprising:
    a step of setting a type of the connected video camera corresponding to an input entered on the side of said computer terminal; and
    a step of selecting one module from among a plurality of modules of the computer terminal which convert control signals received via the network into control signals of different formats, each of the plurality of modules converting received control signals into control signals of a different format corresponding to a different type of camera, the selected one module converting the received control signals into control signals of a different format to be transmitted to the video camera connected to the computer terminal in accordance with information regarding the set type of the connected video camera.

11. A control method of a computer terminal according to claim 10, wherein the information regarding the video camera connected to the computer terminal comprises information on the type of video camera.

12. A control method of a computer terminal according to claim 10, wherein a plurality of video cameras are connected to the computer terminal, and wherein said acquiring step acquires information regarding each of the plurality of video cameras connected to the computer terminal.

13. A control method of a computer terminal according to claim 12, wherein said selecting step selects a module corresponding to one video camera from among the plurality of video cameras connected to the computer terminal.

14. A control method of a computer terminal according to claim 10, wherein the information regarding the video camera connected to the computer terminal comprises interface specifications for transmitting a signal between the video camera and the computer terminal.

15. A control method of a computer terminal according to claim 10, wherein the information regarding the video camera connected to the computer terminal comprises information indicative of the presence of a switcher which permits the connection of a plurality of video cameras to the computer terminal and which selectively switches among video signals from the plurality of video cameras connected to the computer terminal.

16. A control method of a computer terminal according to claim 10, further comprising:
an input step of entering information regarding the video camera connected to the computer terminal; and
a determining step of determining the information regarding the video camera connected to the computer terminal entered in said input step.

17. A control method of a computer terminal according to claim 16, wherein said input step includes inputting an indication of whether a wide angle converter function of the video camera connected to the computer terminal is to be used.

18. A control method of a computer terminal according to claim 10, further comprising an output step of outputting to the network the information regarding the video camera connected to the computer terminal determined by said determining step.

19. A storage medium for storing a computer-readable program for causing a computer terminal to control a video camera locally connected to the computer terminal in accordance with a control signal received via a network from a remote operator, said program causing the computer terminal to:
set a type of the connected video camera corresponding to an input entered on the side of said computer terminal; and
select one module from among a plurality of modules which convert received control signals into control signals of different formats, wherein each of the plurality of modules converts received control signals into a different control format that corresponds to a different type of camera, said selected one module converting the received control signals into control signals to be transmitted to the video camera connected to the computer terminal in accordance with information regarding the set type of video camera connected to the computer terminal.

20. A computer terminal for controlling a video camera locally connected to said computer terminal, from among a plurality of video cameras connected to said computer terminal, in accordance with control signals received via a network from a remote operator, said computer terminal comprising:
a plurality of modules which convert control signals received from the network into control signals of different formats, each of said plurality of modules converting received control signals into control signals of a different format corresponding to a different type of video camera connected to said computer terminal;
a setting device that sets a type of the connected video camera corresponding to an input entered on the side of said computer terminal; and
a selecting device that selects a module from among said plurality of modules to perform a conversion of the received control signals into control signals of a different format to be transmitted to the video camera connected to said computer terminal in accordance with information regarding the set type of the connected video camera.

21. A control method of a computer terminal for controlling a video camera locally connected to the computer terminal, from among a plurality of video cameras connected to said computer terminal, in accordance with control signals received via a network from a remote operator, comprising:
a step of setting a type of the connected video camera corresponding to an input entered on the side of said computer terminal; and
a step of selecting one module from among a plurality of modules of the computer terminal which convert control signals received via the network into control signals of different formats, each of the plurality of modules converting received control signals into control signals of a different format corresponding to a different type of video camera connected to the computer terminal, the selected one module converting the received control signals into control signals of a different format to be transmitted to the video camera connected to the computer terminal in accordance with information regarding the set type of the connected video camera.

* * * * *

UNITED STATES PATENT AND TRADEMARK OFFICE
CERTIFICATE OF CORRECTION

PATENT NO. : 6,670,984 B1
DATED : December 30, 2003
INVENTOR(S) : Koichiro Tanaka et al.

It is certified that error appears in the above-identified patent and that said Letters Patent is hereby corrected as shown below:

Column 3,
Line 49, "(e.g." should read -- (e.g., --.

Column 6,
Line 59, "restrictions" should read -- restriction --.

Column 8,
Line 15, "camera: icon 62c" should read -- camera icon 62c --.

Column 9,
Line 10, "correspondence," should read -- correspondence --.
Line 13, "step S206;" should read -- step S206, --.

Column 10,
Line 35, "statues" should read -- statuses --.

Column 11,
Line 34, "cameras" should read -- cameras, --.
Line 47, "invention is" should read -- disclosed embodiments, and the invention is --.

Signed and Sealed this

Twenty-ninth Day of June, 2004

JON W. DUDAS
*Acting Director of the United States Patent and Trademark Office*